US010390551B1

(12) United States Patent
Guerrero et al.

(10) Patent No.: US 10,390,551 B1
(45) Date of Patent: Aug. 27, 2019

(54) PROCESSING LUPINES (71) Applicant: Black Acorn Ventures, San Francisco, CA (US)

(72) Inventors: Edgar Guerrero, Pichincha (EC); Jeff Sheedy, Pichincha (EC); George Loquvam, Pichincha (EC)

(73) Assignee: Black Acorn Ventures, San Francisco, CA (US)

(*) Notice: Subject to any disclaimer, the term of this patent is extended or adjusted under 35 U.S.C. 154(b) by 0 days.

(21) Appl. No.: 15/983,862

(22) Filed: May 18, 2018

Related U.S. Application Data (63) Continuation of application No. 15/981,675, filed on May 16, 2018.

(51) Int. Cl.
*A23L 5/20* (2016.01)

(52) U.S. Cl.
CPC ........ *A23L 5/23* (2016.08); *A23L 5/21* (2016.08); *A23V 2002/00* (2013.01)

(58) Field of Classification Search
CPC .......... A23L 5/23; A23L 5/21; A23V 2002/00
See application file for complete search history.

(56) References Cited

U.S. PATENT DOCUMENTS

| 4,576,820 | A | 3/1986 | Hussmann | |
| 4,994,272 | A * | 2/1991 | Hussmann | A61K 36/48 504/116.1 |
| 6,335,044 | B1 | 1/2002 | Wasche et al. | |
| 7,074,449 | B1 | 7/2006 | Holley et al. | |
| 2008/0241343 | A1 * | 10/2008 | Mitchell | A23L 2/385 426/634 |
| 2014/0030421 | A1 * | 1/2014 | Markedal | A23J 1/14 426/634 |

OTHER PUBLICATIONS

How to Cook Lupini Beans—Mar. 2018—https://www.christinascucina.com/lupini-beans-and-olives-italian/.*
F. E. Carvajal-Larenas, A. R. Linnemann, M. J. R. Nout, M. Koziol & M. A. J. S. van Boekel (2016) Lupinus mutabilis: Composition, Uses, Toxicology, and Debittering, Critical Reviews in Food Science and Nutrition, 56:9, 1454-1487, DOI: 10.1080/10408398.2013.772089 (35 pages).
Carvajal-Larenas, "Managing technological aspects of Lupinus Mutabilis from food sovereignty perspective in Ecuador", Thesis presented at Wageningen University, Oct. 28, 2013 (224 pages).

* cited by examiner

*Primary Examiner* — Anthony J Weier
(74) *Attorney, Agent, or Firm* — Fish & Richardson P.C.

(57) ABSTRACT

An example implementation of the subject matter described within this disclosure is a lupine processing apparatus with the following features. A tank is configure to receive a portion of lupines for processing. The tank has an outer surface that defines a receiving cavity within the tank. The tank includes a fluid inlet at a bottom end of the tank. The inlet is configured to receive fluid into the tank. A fluid outlet is at a top end of the tank. The fluid outlet is configured to receive fluid from the tank. A motor is attached to the tank. An agitator is rotatably coupled to the motor. The agitator is configured to be rotated by the motor. A heater is fluidically connected to the fluid inlet. The heater is configured to increase a temperature of the fluid.

19 Claims, 5 Drawing Sheets

PROCESSING LUPINES

CLAIM OF PRIORITY

This application claims priority under 35 USC § 119(e) to U.S. patent application Ser. No. 15/981,675, filed on May 16, 2018, the entire contents of which are hereby incorporated by reference.

TECHNICAL FIELD

This disclosure relates to processing food for human consumption.

BACKGROUND

*Lupinus Mutabilis*, colloquially known as the chocho bean, is a nutritious legume native to the Andes. Chocho is cultivated in the Andean regions of Bolivia, Peru and Ecuador at 2600-3300 meters above the sea level. The chocho (*l.mutabilis*) bean is quite high in bitter and toxic alkaloids, such as quinolizidine alkaloids. These alkaloids are water-soluble, so chocho seeds/beans are commonly repeatedly soaked and rinsed for days before consumption to remove the bitter-tasting and toxic quinolizidine alkaloids. De-bittered chocho beans with low levels of quinolizidine alkaloids have been a part of the diet of the Andean indigenous people for hundreds of years. Chocho is a secondary long season annual crop with a growing season lasting 7-9 months depending on area and altitude. After harvesting, chocho beans are dried and cleaned, and can be stored for later use during the year.

SUMMARY

This disclosure describes technologies relating to processing lupines.

An example implementation of the subject matter described within this disclosure is a lupine processing apparatus with the following features. A tank is configure to receive a portion of lupines for processing. The tank has an outer surface that defines a receiving cavity within the tank. The tank includes a fluid inlet at a bottom end of the tank. The inlet is configured to receive fluid into the tank. A fluid outlet is at a top end of the tank. The fluid outlet is configured to receive fluid from the tank. A motor is attached to the tank. An agitator is rotatably coupled to the motor. The agitator is configured to be rotated by the motor. A heater is fluidically connected to the fluid inlet. The heater is configured to increase a temperature of the fluid.

Aspects of the example implementation, which can be combined with the example implementation alone or in combination, include the following. The lupines comprise *lupinus mutabilis* beans.

Aspects of the example implementation, which can be combined with the example implementation alone or in combination, include the following. A recirculation line is configured to direct fluid from the fluid outlet to the fluid inlet.

Aspects of the example implementation, which can be combined with the example implementation alone or in combination, include the following. A treatment system is configured to remove alkaloids from a recirculated fluid stream.

Aspects of the example implementation, which can be combined with the example implementation alone or in combination, include the following. The alkaloids include quinolizidine alkaloids.

Aspects of the example implementation, which can be combined with the example implementation alone or in combination, include the following. The treatment system includes an alkaloid absorbing material.

Aspects of the example implementation, which can be combined with the example implementation alone or in combination, include the following. The treatment system includes a reverse osmosis system.

Aspects of the example implementation, which can be combined with the example implementation alone or in combination, include the following.

Aspects of the example implementation, which can be combined with the example implementation alone or in combination, include the following. The agitator includes a central shaft with a first end rotatably coupled to the motor. A paddle connects to a second end of the shaft. The paddle has a rake angle of 40° to 80° from the central shaft.

Aspects of the example implementation, which can be combined with the example implementation alone or in combination, include the following. The rake angle is configured to cause the lupines to slide along an inner surface of the tank towards the top end of the tank, and then slide towards the bottom end of the tank along the inner surface and back into the fluid.

Aspects of the example implementation, which can be combined with the example implementation alone or in combination, include the following. The agitator is configured to rotate such that a radial edge of the paddle has a speed substantially between 100 meters/minute and 140 meters per minute.

Aspects of the example implementation, which can be combined with the example implementation alone or in combination, include the following. The tank further includes a valve at the bottom end of the tank. The valve defines an opening in the bottom end of the tank when the valve is in an open position. The valve is configured to release processed lupines from the tank.

An example implementation of the subject matter described within this disclosure is a lupine processing method with the following features. A portion of raw lupines is received by a tank for processing. Water is received into the tank. The lupines are hydrated by the water for a specified duration of time. The lupines are agitated by a mechanical agitator for a second specified duration of time. The lupines are thermally shocked for a third specified duration of time at a specified frequency. Water is circulated through the tank for a specified amount of time. Select constituents of the lupines are removed by the circulating water.

Aspects of the example method, which can be combined with the example method alone or in combination, include the following. The select constituents include alkaloids.

Aspects of the example method, which can be combined with the example method alone or in combination, include the following. The lupines include the species *lupinus mutabilis*.

Aspects of the example method, which can be combined with the example method alone or in combination, include the following. Hydrating the lupines includes soaking the lupines for substantially eighteen to twenty-four hours.

Aspects of the example method, which can be combined with the example method alone or in combination, include the following. Thermally shocking the lupines includes boiling the water for substantially thirty minutes.

Aspects of the example method, which can be combined with the example method alone or in combination, include the following. The circulated water has a temperature value of substantially 35° C.

Aspects of the example method, which can be combined with the example method alone or in combination, include the following. Circulating the water includes flowing a stream of water through an inlet of the tank, through the lupines, and out an outlet of the tank, towards a waste disposal system.

Aspects of the example method, which can be combined with the example method alone or in combination, include the following. A decontamination unit is included. Circulating the water includes flowing a stream of water through an inlet of the tank, through the lupines, out an outlet of the tank, through a decontamination unit, and back into the inlet of the tank.

Aspects of the example method, which can be combined with the example method alone or in combination, include the following. Circulating the water includes flowing the water until a contamination level is less than a specified threshold.

An example implementation of the subject matter described within this disclosure is a lupine processing system comprising with the following features. A tank is configure to receive a portion of lupines for processing. The tank has an outer surface that defines a receiving cavity within the tank. The tank includes a fluid inlet at a bottom end of the tank. The inlet is configured to receive fluid into the tank. A fluid outlet is at a top end of the tank. The fluid outlet is configured to receive fluid from the tank. A motor is attached to the tank. An agitator is rotatably coupled to the motor. The agitator is configured to be rotated by the motor. A heater is fluidically connected to the fluid inlet. The heater is configured to increase a temperature of the fluid. The system includes a controller with one or more processors and a non-transitory computer-readable storage medium that coupled to the one or more processors. The non-transitory computer-readable storage medium stores programming instructions for execution by the one or more processors. The programming instructions instruct the one or more processors to flow water into the tank. The programming instructions instruct the one or more processors to hydrate the lupines with the water for a specified amount of time. The programming instructions instruct the one or more processors to agitate the lupines by a mechanical agitator for a specified amount of time. The programming instructions instruct the one or more processors to thermally shock the lupines for a specified amount of time. The programming instructions instruct the one or more processors to circulate water through the tank. The programming instructions instruct the one or more processors to remove select constituents of the lupines by the circulating water.

Particular implementations of the subject matter described in this disclosure can be implemented so as to realize one or more of the following advantages. Only mechanical methods involving heat and agitation are used, preventing unnecessary chemicals into a future food source. Aspects of this disclosure allow for reduced water consumption during processing and/or prevent environmental contamination from the processing. Aspects of this disclosure can reduce processing times from substantially two weeks to substantially two days. Aspects of this disclosure reduce the labor needed to process the chocho beans. The process in this disclosure is standardized, resulting more a reliable alkaloid removal process. The overall energy used during the disclosed process is less than traditional processes. The described systems and methods results in a smaller physical footprint to process a similar amount of products as traditional systems and methods.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As demand has increased, Andean farmers have increased production and commercial use of *Lupinus Mutabilis*, colloquially known as the chocho bean, in recent years. Contamination of water sources with toxic alkaloids, such as quinolizidine alkaloids, from processing and de-bittering the chochos makes increasing production difficult. Food safety risks from traditional processing methods can also lead to microbiologically contamination of processed chochos. Such factors need to be addressed for large-scale production to be successful. Given the long growing season, difficulty de-bittering the beans, and the need to clean the beans, almost all chocho production and processing is currently in the hands of small producers growing the bean on hillside farms. To date, there is no known machinery in chocho growing areas that can mechanically de-bitter and process the beans. Therefore the process continues to be manual, tedious, and time-consuming.

This disclosure describes a system and method for processing chochos in such a way as to mitigate these concerns and still scale up production. The system includes a tank configured to receive the chochos. The chochos are then exposed to one or more increased temperature cycles to thermally shock the chochos in water. Such thermal shocks increase an alkaloid decontamination rate without significantly decreasing the nutritional value of the chochos. In some implementations, there is no decrease in nutritional value. The chochos are agitated during the shock cycles, and the waste-water is disposed of without releasing toxic alkaloids to the environment. While this disclosure specifically describes systems and methods for processing chochos, similar systems and methods can be used on other food products, such as other legumes.

Figure 1:
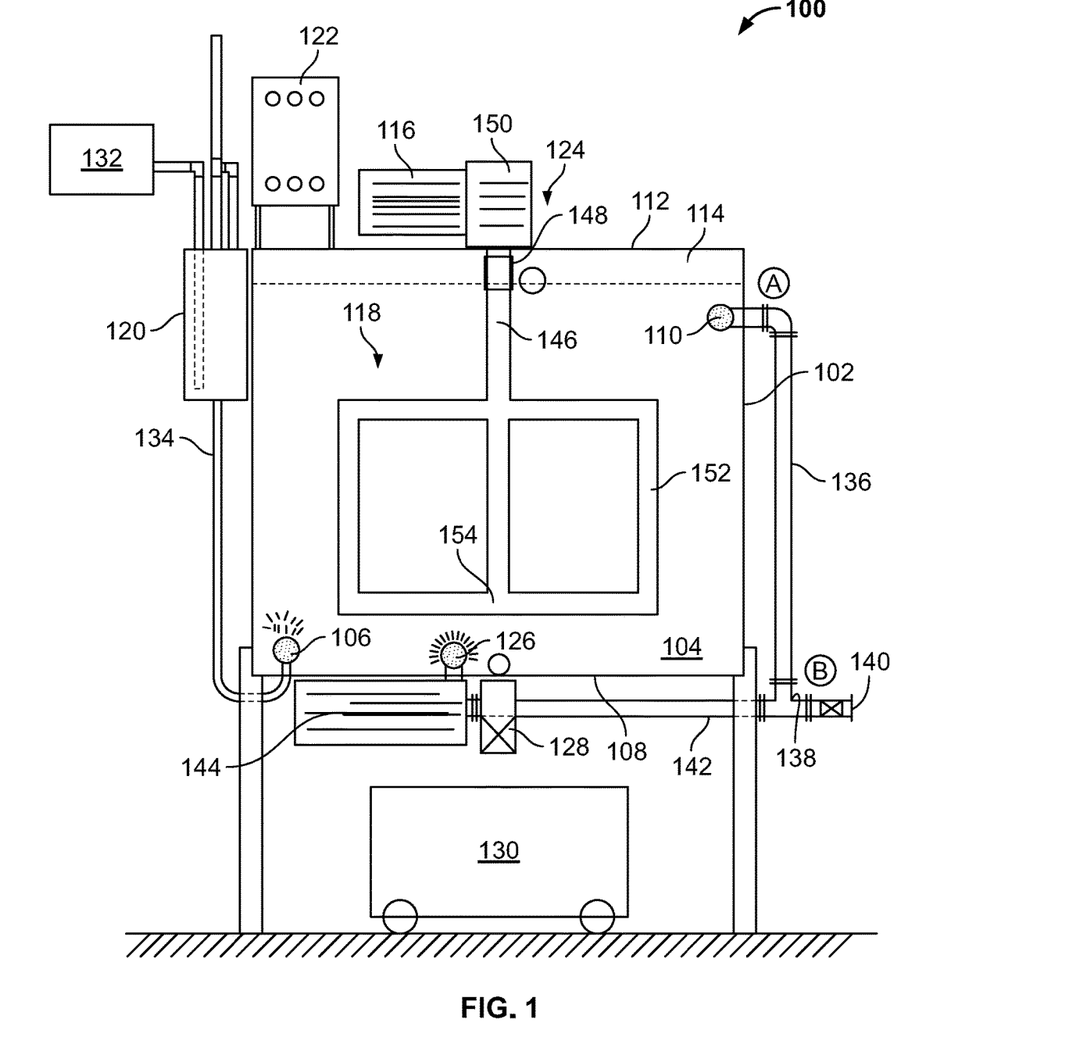
FIG. 1 is a side cross-sectional view of an example lupine processing system.

FIG. 1 is a side cross sectional view of an example lupine processing system 100 that can be utilized with aspects of this disclosure. The system includes a tank 102 that is configured to receive a portion of lupines and an amount of fluid, such as water, for processing. The tank 102 has an outer surface that defines a processing cavity 104. The tank 102 includes a fluid inlet 106 at a bottom end 108 of the tank 102. The inlet 106 is configured to receive fluid into the tank 102. There is a fluid outlet 110 near a top end 112 of the tank 102 that is configured to receive fluid from the tank 102 during operation. A lid 114 is configured to cover the tank 102 and prevent contaminants from falling into the tank 102 during processing. The lid 114 can be loose fitting as to prevent pressure build-up within the tank 102 during processing. A motor 116 is attached to the tank 102. While the illustrated implementation shows the motor being attached to the tank 102 via the lid 114 near the top of the tank 102, the motor 116 can be placed anywhere on the tank 102 without departing from this disclosure. An agitator 118 is rotatably coupled to the motor 116 and is configured to be rotated by the motor 116. A heater 120 is fluidically connected to the fluid inlet 106. The heater 120 is configured to increase a temperature of the fluid. The system 100 also includes a controller 122 with one or more processors and a non-transitory computer-readable storage medium that is coupled to the processors. The non-transitory memory can store programming instructions for execution by the one or more processors. In general, the controller 122 is configured to control several aspects of the chocho processing system 100. Such aspects can include fluid temperature, motor speed, motor current draw, timing of processing steps, and other aspects. For example, the controller can raise the temperature of the tank to initiate a first temperature shock, and lower the temperature after thirty minutes. After the thermal shock, the entire fluid contents of the tank can be flushed and replaced prior to the next thermal shock cycle. An operator can monitor the process and determine a saturation of the water through color, taste, testing with pH paper, or any other method. Details of the system operation are discussed in greater detail later within this disclosure.

The tank 102, as illustrated, has a substantially cylindrical shape, but other shapes can be used for the tank depending on available manufacturing processes. The tank 102 receives the portion of lupines for processing through an opening 124 at the top end 112 of the tank 102. The lid 114 is configured to rest atop the tank 102 without creating a pressure seal on the tank 102. The tank 102 includes a first inlet 106 and a second inlet 126 located near the bottom 108 of the tank 102. In some implementation the first fluid inlet 106, the second fluid inlet 126, or both, can include an inlet diffuser, screen, check valve, or other flow devices to help prevent back-flow of the lupines into the inlets. Near the top 112 of the tank 102 is a fluid outlet configured to receive fluid from the tank. In some implementations, the fluid outlet 110 can include a screen to prevent the lupines from exiting the tank 102 prematurely during processing. At the bottom 108 of the tank is a dumping valve 128 that defines an opening in the bottom 108 of the tank 102 when the valve is in an open position. The dumping valve 128 is large enough to release processed lupines from the tank 102 when opened. In some implementations, a cart 130 or other container can be positioned below the dumping valve 128 to receive the processed lupines. In some implementations, a transport auger can be used to transfer the processed lupines to a desired location.

The heater 120 is fluidically connected to the fluid inlet 106. The heater 120 is configured to increase a temperature of the fluid. The heater 120 can include an electric heater, a gas heater, a heat media circulation line, or any other type of heater. As configured in the illustration, the heater 120 takes water, or any other fluid, from an outside source 132. The fluid is then super-heated to produce steam that is directed to the first inlet 106 by a conduit 134. The amount of steam and the temperature of the steam is regulated by the controller 122. The steam is used to thermally shock the lupines within the tank 102. In some instances, the steam can be used to raise the temperature of a fluid within the tank 102, for example, to boiling temperatures.

As steam is introduced into the system through the inlet 106, excess fluid is directed out of the fluid outlet 110 located near the top of the tank. The fluid outlet 110 is fluidically connected to the conduit 136 leading to a directing valve 138. The directing valve 138 can direct the fluid to be recirculated, direct the fluid to a separate end user, or a combination. In instances where the fluid is directed to an end user, the directing valve 138 directs the fluid out a conduit outlet 140 towards any end user desired by the operator. The end user can include a testing apparatus to measure a constituent level within the waste-water. For example, a testing device can be used to determine that a level of quinolizidine alkaloids is below acceptable regulatory levels. In some implementations, trained operators can taste the waste-water to determine if the lupines have been sufficiently de-bittered.

In some implementations, the wastewater is directed towards an alkaloid harvesting system. In such an implementation, the alkaloids are pulled from the waste stream and concentrated so that the alkaloids can be used in industrial applications. For example, the alkaloids can be used as a fungicide, pesticide, and/or disinfectant for crops and/or livestock. In some instances, the alkaloids can be used in the pharmaceutical and/or cosmetic industries as well.

In some implementations, the waste-water is directed towards a decontamination system prior to being released into the environment. In such an implementation, the treatment system can include an alkaloid absorbing material, a reverse osmosis system, a de-ionizing system, a distillation system, mechanical filtering, any combination of the previous systems, or any other filtration system capable of reducing a contamination level of the waste-water stream to be within local regulations. In some implementations, the waste-water can be pasteurized to prevent residual sugars from fermenting.

In instances where the directing valve 138 directs the fluid to be recirculated, the directing valve 138 directs the fluid through a recirculation conduit 142. The recirculation conduit 142 directs the fluid into a second fluid inlet 126 located near the bottom 108 of the tank 102. In some implementations, the recirculation conduit 142 can direct the fluid through a decontamination module 144. In such an instance, the decontamination module 144 is configured to reduce a select constituent level of the recycled fluid. For example, the decontamination module 144 can be configured to reduce an amount of quinolizidine alkaloids in the recycled fluid stream. Such a reduction in select constituents allows for reduced total water consumption during the de-bittering process. The decontamination module 144 can include an alkaloid absorbing material, a reverse osmosis system, a de-ionizing system, a distillation system, mechanical separation, or any other filtration system capable of reducing a constituent level appropriate for the process. In some instances, a first pass through the decontamination module 144 can remove 50% of the constituents, while a second pass removes 80% of the constituents. In some instances, a combination of decontamination system components can be used in series or parallel. In some instances, the decontamination module 144 may not be include. The waste water in its natural state acts as a fungicide and serves to neutralize black water in the sewage systems.

The agitator 118 is rotatably coupled to the motor 116 and is configured to be rotated by the motor 116. As illustrated, the system includes a single agitator 118 that extends centrally into the tank 102, but other agitator arrangements, such as multiple agitators spread throughout the tank 102, can be used without departing from this disclosure. The agitator 118 includes a central shaft 146 with a first end 148 rotatably coupled to the motor 116. In some implementations, a gearbox 150 or pulley system can exist between the agitator 118 and the motor 116. A paddle 152 is connected to a second end 154 of the shaft 146. In some implementations, the paddle 152 has a rake angle between 40° to 80° from the central shaft 146. In some implementations, the paddle 152 has a rake angel between 50° and 70° from the central shaft 146. In some implementations, the paddle can have a rake angle of substantially 60° from the central shaft 146 within standard manufacturing tolerances. In some implementations, the paddle can include five blades radiating from the central shaft 146. The rake angle is configured to cause the lupines circulate in the fluid in a toroidal direction. That is, the lupines can travel along the inner surface of the tank 102 towards the top end 112 of the tank 102 before traveling towards the bottom 108 of the tank 102 near the center towards the shaft 146. Alternatively, the lupines can slide towards the bottom end 108 of the tank 102 along the inner surface and back towards the top 112 of the tank 102 through the center of the tank 102 near the shaft 146. Such agitation can speed up the de-bittering process.

In general, the agitator rotates slowly as to prevent cavitation and or damage to the beans. In some implementation, the agitator 118 is configured to rotate such that a radial edge of the paddle 152 has a speed substantially between 100 meters/minute and 140 meters/minute. In some implementations, the agitator 118 is configured to rotate such that a radial edge of the paddle 152 has a speed substantially between 110 meters/minute and 130 meters/minute. In some implementations, the agitator 118 is configured to rotate such that a radial edge of the paddle 152 has a speed of substantially 120 meters/minute within the speed control tolerances of the controller 122. The speed is configured such that the paddle 152 will not cause significant damage to the lupines during processing but will still allow for sufficient turbulence to reduce processing time. For example, the agitator can rotate between thirty and fifty rotations per minute. In some implementations, the agitator can rotate at substantially 38.2 rotations per minute within the speed control tolerances of the controller 122. In some implementations, the controller 122 can include a current controller configured to shut-off the motor in an over-torque situation.

Figure 2A:
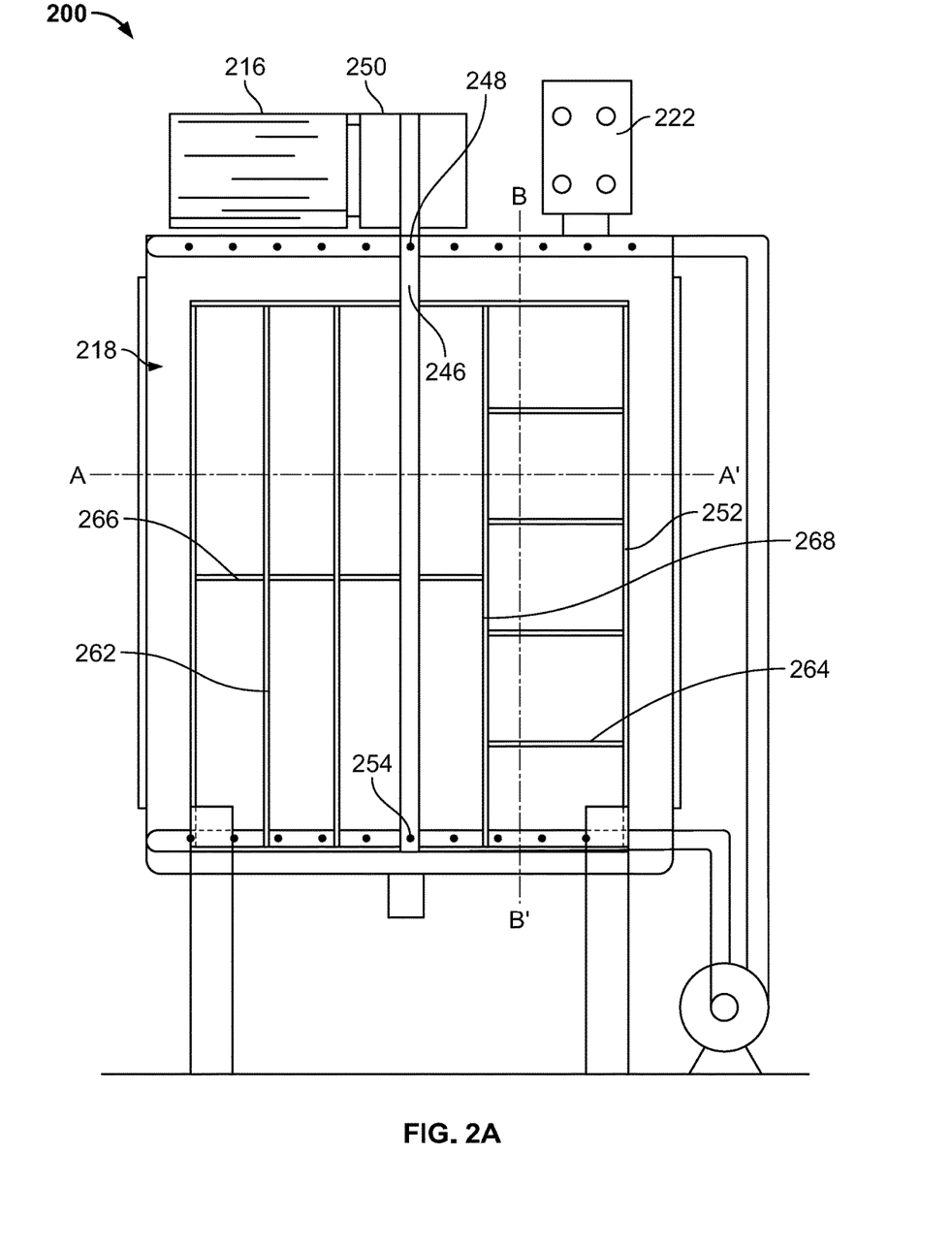
FIG. 2A is a side cross-sectional view of an example lupine processing system.

FIG. 2A shows a side cross sectional view of an example lupine processing system 200 that can be utilized with aspects of this disclosure. System 200 includes an agitator 218. The agitator 218 is rotatably coupled to the motor 216 and is configured to be rotated by the motor 216. The agitator 218 includes a central shaft 246 with a first end 248 rotatably coupled to the motor 216. In some implementations, a gearbox 250 or pulley system can exist between the agitator 218 and the motor 216. A paddle 252 is connected to a second end 254 of the shaft 246.

In general, the agitator 218 rotates slowly as to prevent cavitation and or damage to the beans. In some implementation, the agitator 218 is configured to rotate such that a radial edge of the paddle 252 has a speed substantially between 200 meters/minute and 240 meters/minute. In some implementations, the agitator 218 is configured to rotate such that a radial edge of the paddle 252 has a speed substantially between 220 meters/minute and 230 meters/minute. In some implementations, the agitator 218 is configured to rotate such that a radial edge of the paddle 252 has a speed of substantially 220 meters/minute within the speed control tolerances of the controller 222. The speed is configured such that the paddle 252 will not cause significant damage to the lupines during processing but will still allow for sufficient turbulence to reduce processing time. For example, the agitator can rotate between thirty and fifty rotations per minute. In some implementations, the agitator can rotate at substantially 38.2 rotations per minute within the speed control tolerances of the controller 222. In some implementations, the controller 222 can include a current controller configured to shut-off the motor in an over-torque situation.

In some implementations, the paddle 252 can include multiple vertical blades 262 and multiple horizontal blades 264 that rotate around the central shaft. The horizontal blades 264 and/or vertical blades 262 can include a rake angle that is configured to cause the lupines circulate in the fluid, for example, in a toroidal direction. That is, the lupines can travel along the inner surface of the tank 202 towards the top end 222 of the tank 202 before traveling towards the bottom 208 of the tank 202 near the center towards the shaft 246. Alternatively, the lupines can slide towards the bottom end 208 of the tank 202 along the inner surface and back towards the top 222 of the tank 202 through the center of the tank 202 near the shaft 246. Such agitation can speed up the de-bittering process. Additional vertical stabilizers 268 and horizontal stabilizers 266 can be used in the paddle 252 as well. The vertical stabilizers and/or horizontal stabilizers can include a rake angle or no rake angle.

Figure 2B:
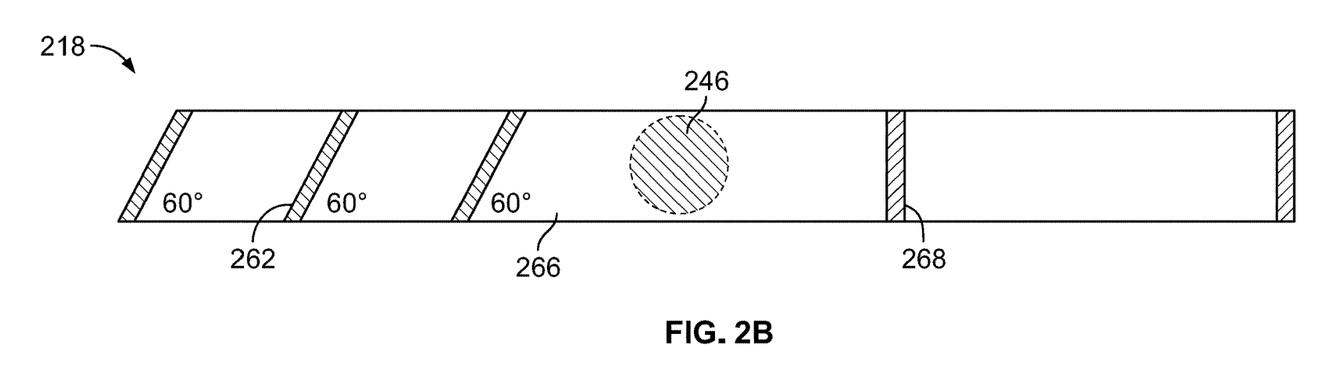
FIG. 2B is a cross-sectional view of an example agitator.
Figure 2C:
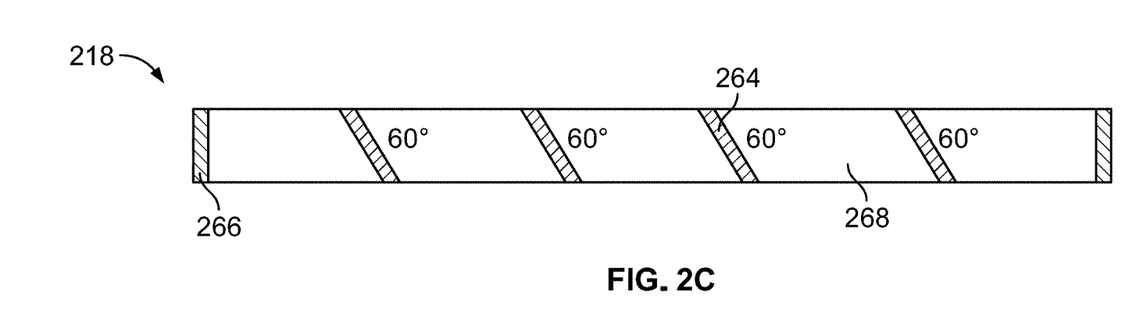
FIG. 2C is a cross-sectional view of an example agitator.

FIGS. 2B-2C illustrates cross sectional views of the horizontal blades 264 and the vertical blades 262. FIG. 2B is a cross sectional view of reference line A-A' (FIG. 2A) while FIG. 2C is a cross sectional fore of reference line B-B'. In some implementations, the horizontal blades and/or the vertical blades have a rake angle between 40° to 80° from the central shaft 246. In some implementations, the paddle 252 has a rake angel between 50° and 70° from the central shaft 246. In some implementations, the paddle can have a rake angle of substantially 60° from the central shaft 246 within standard manufacturing tolerances.

Figure 3:
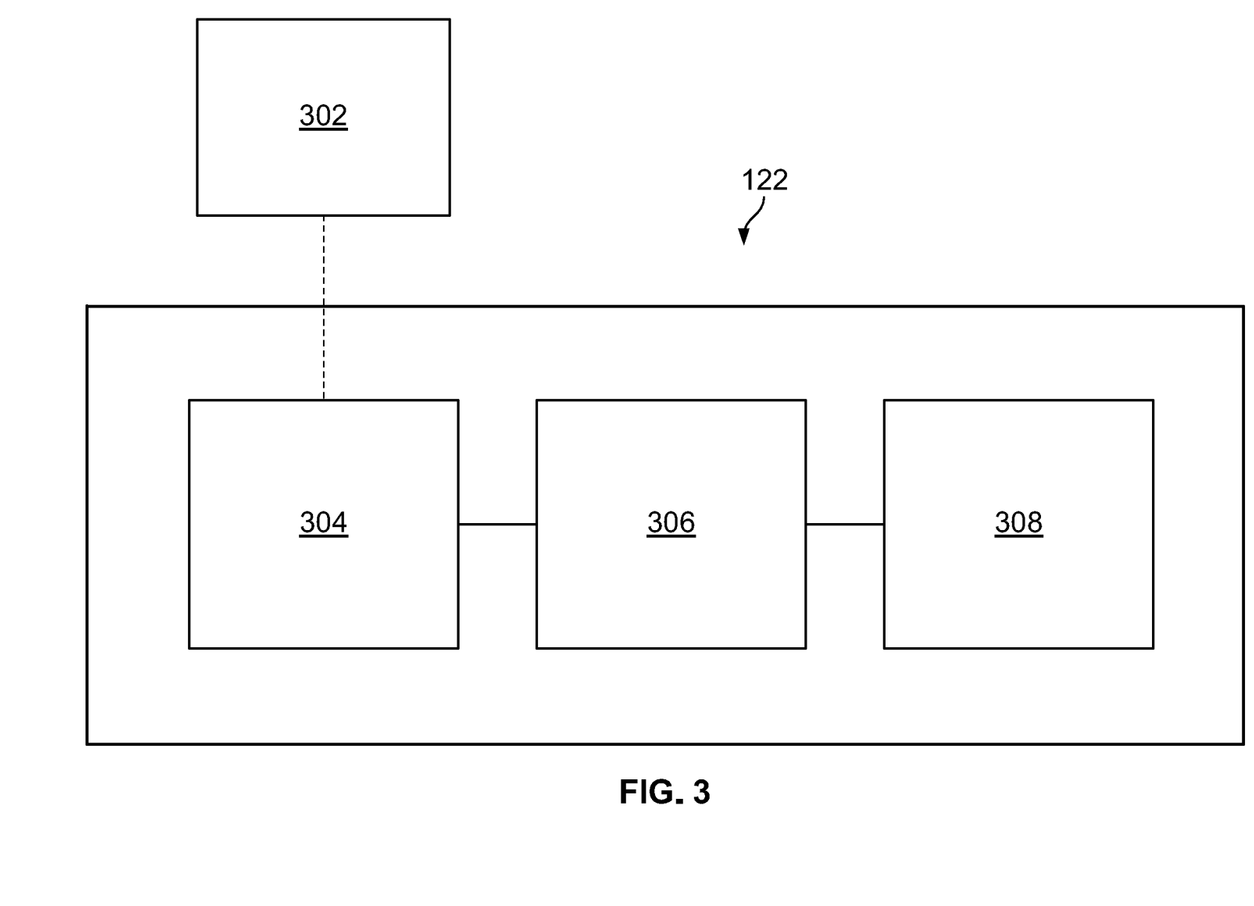
FIG. 3 is schematic block diagram of an example controller that can be used with aspects of this disclosure.

FIG. 3 is a schematic block diagram of an example controller 122 that can be used with aspects of this disclosure. The controller 122 is coupled to the various components 302 of the system 100, such as the motor 116, the valves, the heater 120 and any other systems that an end user deems necessary, through an I/O interface 304. The controller 122 can include one or more processors 306 and a non-transitory computer-readable storage medium 308 coupled to the one or more processors 306. The computer-readable storage medium 308 stores programmed instructions that can be executed by the one or more processors 306. Potential programmed instructions are apparent throughout the disclosure.

Figure 4:
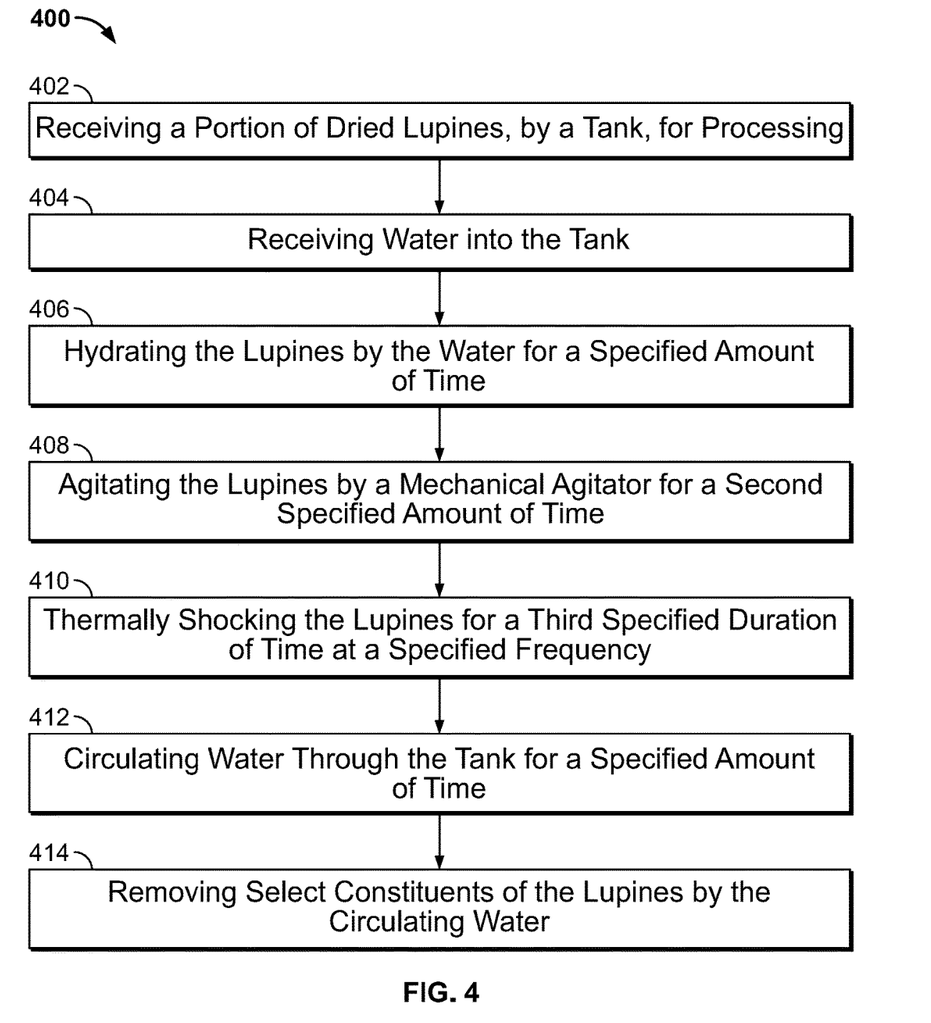
FIG. 4 is a flowchart of an example method that can be used with aspects of this disclosure.

FIG. 4 is a flowchart of an example method 400 that can be used with aspects of this disclosure. Items found in FIG. 1 are also referenced during the following description of the method 400. At 402 a portion of raw lupines are received by the tank 102 for processing. In some implementations, the tank 102 can hold between five hundred kilograms and one hundred kilograms of raw lupines. In some implementations, the tank 102 can hold between four hundred kilograms and two hundred kilograms of raw lupines. In some implementations, the tank 102 can hold substantially three hundred kilograms of lupines. The raw lupines can include *Lupinus Mutabilis*. At 404, water is flowed into the tank 102. In some implementation, the tank 102 is configured to receive between 1500 and 600 liters of water in addition to the raw lupines. In some implementations, the tank 102 is configured to receive between 1200 and 800 liters of water. In some implementations, the tank 102 is configured to receive substantially 1100 liters of water. In some implementations, three liters of water are used for every kilogram of raw lupine.

At 406, the lupines are hydrated by the water for a specified amount of time. In some implementations, the lupines are hydrated for between twelve to thirty six hours. In some implementations, the lupines are hydrated for between eighteen to twenty four hours. In some instances, hydrating the lupines involves letting the lupines rest in the water without the aid of the agitator 118.

At 408, the lupines are agitated by the mechanical agitator 118 for a specified amount of time after the lupines are hydrated. At 410 the lupines are thermally shocked for a specified duration of time at a specified frequency. For example, the lupines can be agitated and heated to boiling temperature, using the heater 120, and held at a boiling temperature for substantially thirty minutes plus or minus 5 minutes. In some instances, the boiling temperature can change due to altitude. In such a situation, the water reaching a boiling state is sufficient for the processes described within this disclosure. Such cycle can be repeated multiple times, purging the fluid between each cycle. In some implementations such a cycle is repeated two times.

At 412, water is circulated through the tank 102 for a specified amount of time. That is, a stream of water is flowed through the first inlet 106, the second inlet 126, or a combination, through the lupines, and out an outlet 110 of the tank 102, towards a waste disposal system or a recirculation system. In some implementations, there is a single complete turnover of the water within the tank. In some implementations, the circulated water is has a temperature value between 40° C. and 50° C. In some implementations, the circulated water has a temperature value of substantially 35° C. (room temperature). At 414, constituents of the lupines are removed by the circulating water. Such removal can also occur between thermal cycles. In some implementations, the constituents include alkaloids, such as quinolizidine alkaloids. Alternatively or in addition, bacteria and other constituents can be removed with this process. The water flows until the level of quinolizidine alkaloids is below a specified threshold. For example, this threshold can be 0.08%. The amount/level of quinolizidine alkaloids can be determined by taste testing, analysis with spectroscopic, colorimetric, chromatographic, titrimetric or mass spectrometric methods, or any combination thereof.

After the levels of quinolizidine alkaloids are acceptable, the water is drained and the lupines can be dumped into the cart 130 through the dumping valve 128. In some instances, the agitator 118 can be used to help dump the lupines through the dumping valve 128. In some implementations, the lupines can be directed to an auger transport by the dumping valve 128. After processing, the lupines can be dehydrated for shipping, be packaged and sold locally, or go through further processing for other food products.

In some implementations, minerals, such as salt, can be added to the water during processing. In some implementations, the pH of the water can be adjusted during processing. For example, decreasing the pH of the water to within four to five pH can accelerate the removal of the alkaloids described within this disclosure. In such instances, nutrients, such as proteins are less soluble, so alkaloid removal is increased without reducing the nutritional value of the lupines. In some implementations, whole lupines or partial lupines can be used. In instances where only partial lupines are used, the lupines can be sliced, for example, into halves or quarters, by a separate machine prior to processing. In general, the smaller the lupine slices, the more quickly they can be processed as the surface area of the Lupines increases. In some instances, the slicer can be integrated with the system 100.

Slight variations on aspects of this disclosure can be made without departing from this disclosure. For example, tank geometry can be varied. In other implementations, a pressure pump and/or compressed air could provide agitation instead of, or in addition to, a paddle. In some implementations, fluid streams can include direct and/or indirect steams. In general, any implementation that includes the common principle of heat, agitation, and time does not depart from this disclosure. Aspects of this disclosure can be used to produce an edible product.

Inside the tank, circular piping in ring formation can be used both at the top of the tank and bottom of the tank. Such an arrangement allows for activation of an external pump and water circulation for the de-bittering step. In some implementations, the product can be discharged from the bottom of the tank through release piping that has a valve connected to the helical centrifuge pump or auger. Outside the tank, Insulation can be added to help maintain a desired temperature.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A lupine processing method comprising:
receiving, by a tank, whole lupines for processing;
receiving water into the tank;
hydrating the whole lupines by the water in the tank;
agitating the whole lupines by a mechanical agitator;

thermally shocking the whole lupines at a specified frequency;
circulating the water through the tank; and
removing selected constituents of the whole lupines by the circulating water.

2. The method of claim 1, wherein the selected constituents comprise alkaloids.

3. The method of claim 1, wherein the whole lupines comprise the species *lupinus mutabilis*.

4. The method of claim 1, where hydrating the whole lupines comprises soaking the whole lupines for at least eighteen to twenty-four hours.

5. The method of claim 1, wherein thermally shocking the whole lupines comprises boiling the water for at least thirty minutes.

6. The method of claim 1, wherein the circulated water has a temperature value of at least 35° C.

7. The method of claim 1, wherein circulating the water comprises flowing a stream of water through an inlet of the tank, through the whole lupines, and out an outlet of the tank, towards a waste disposal system.

8. The method of claim 1, wherein circulating the water comprises flowing a stream of water through an inlet of the tank, through the whole lupines, out an outlet of the tank, through a decontamination unit, and back into the inlet of the tank.

9. The method of claim 1, wherein circulating the water comprises flowing the water until a select constituent level within wastewater resulting from the method is less than a specified threshold.

10. The method of claim 1, wherein hydrating the whole lupines comprises soaking the whole lupines in static water without agitation.

11. The method of claim 1, wherein the steps of agitating the whole lupines and thermally shocking the whole lupines are performed concurrently.

12. The method of claim 1, wherein thermal shocking the whole beans at a specified frequency further comprises:
raising a temperature of the tank to a first temperature to initiate a first temperature shock; and
lowering the temperature of the tank to a second temperature after a specified duration of time.

13. The method of claim 12, wherein steam is used to heat the water in the tank.

14. The method of claim 12, further comprising flushing the tank of fluid contents after the temperature of the tank is lowered to the second temperature.

15. The method of claim 1, further comprising:
determining that a level of quinolizidine alkaloids in wastewater resulting from the method is below a threshold level.

16. The method of claim 15, further comprising:
extracting alkaloids from wastewater resulting from the method; and
concentrating the extracted alkaloids.

17. The method of claim 1, wherein agitating the whole lupines further comprises:
circulating the water in the tank in a toroidal direction to cause the lupines to travel along an inner surface of the tank towards a top end of the tank before traveling towards a bottom of the tank near a center of the tank.

18. The method of claim 17, wherein mechanically agitating the whole lupines includes mechanically agitating the whole lupines with the circulating water in the tank.

19. The method of claim 1, wherein mechanically agitating the whole lupines includes mechanically agitating the whole lupines with a paddle.

* * * * *